Figure 6:
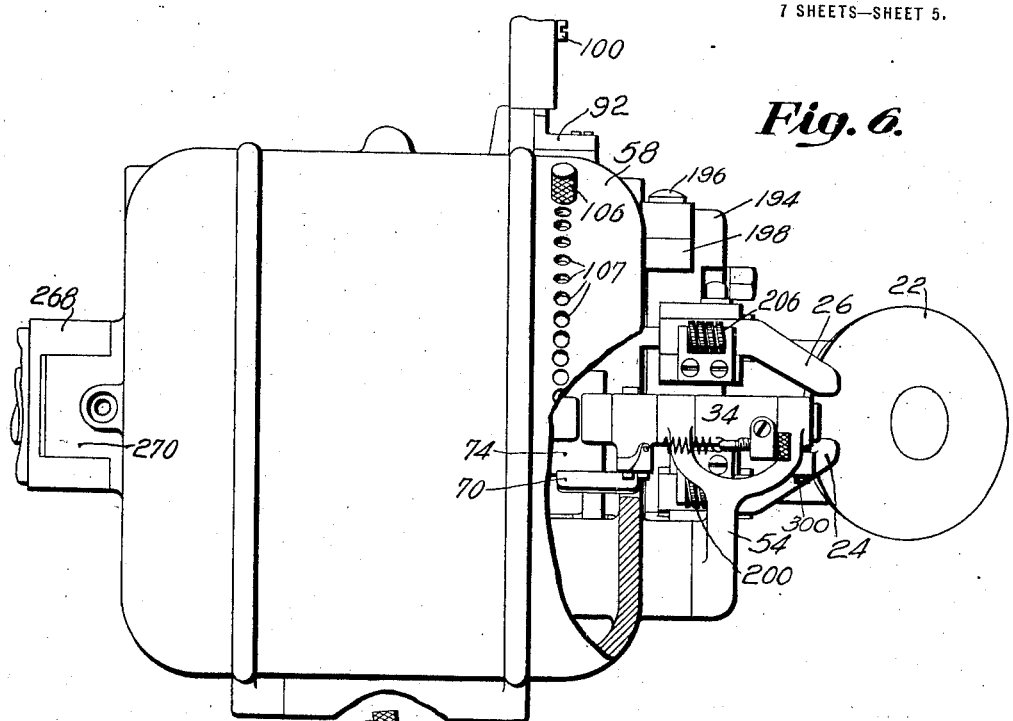

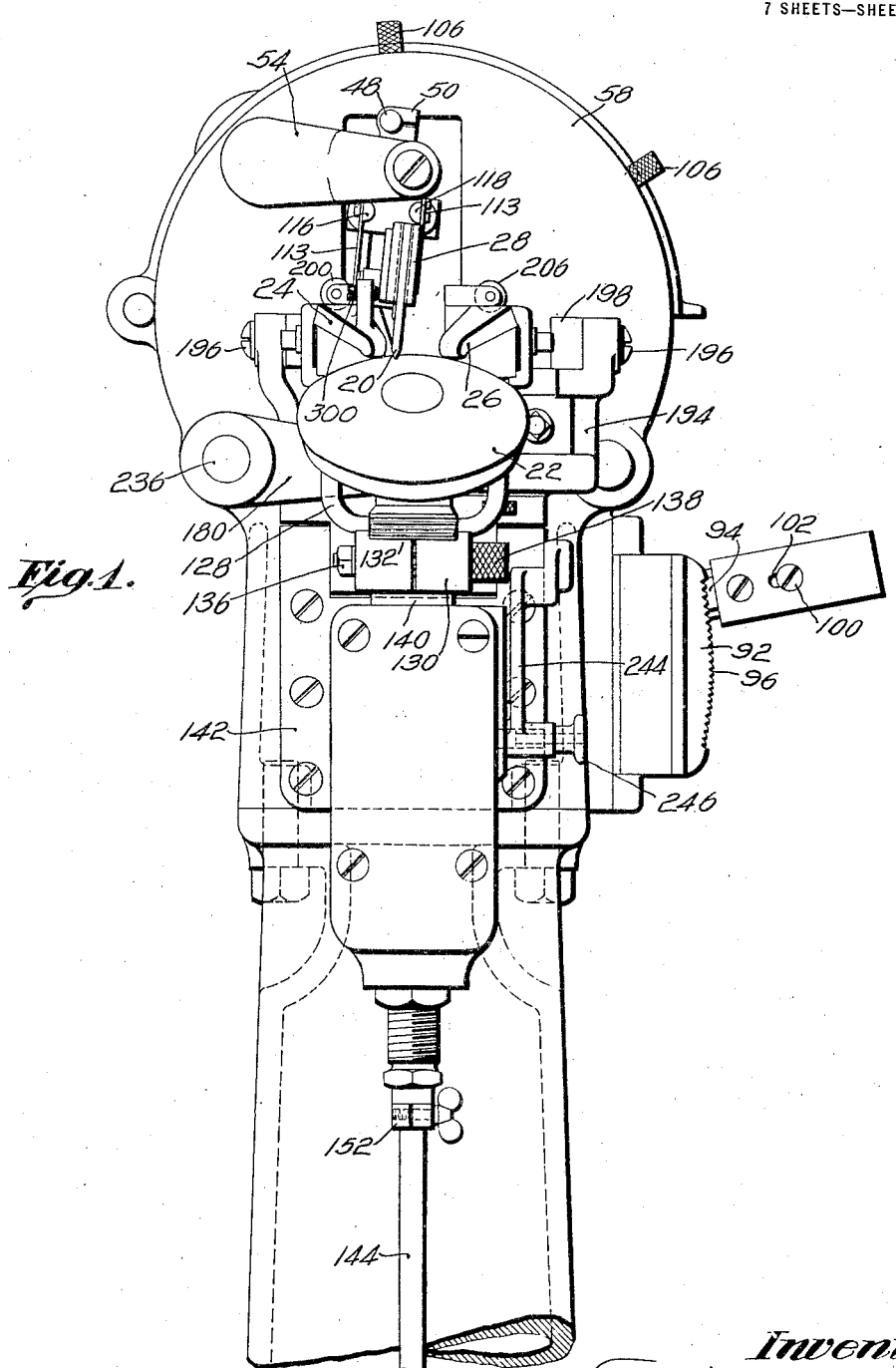

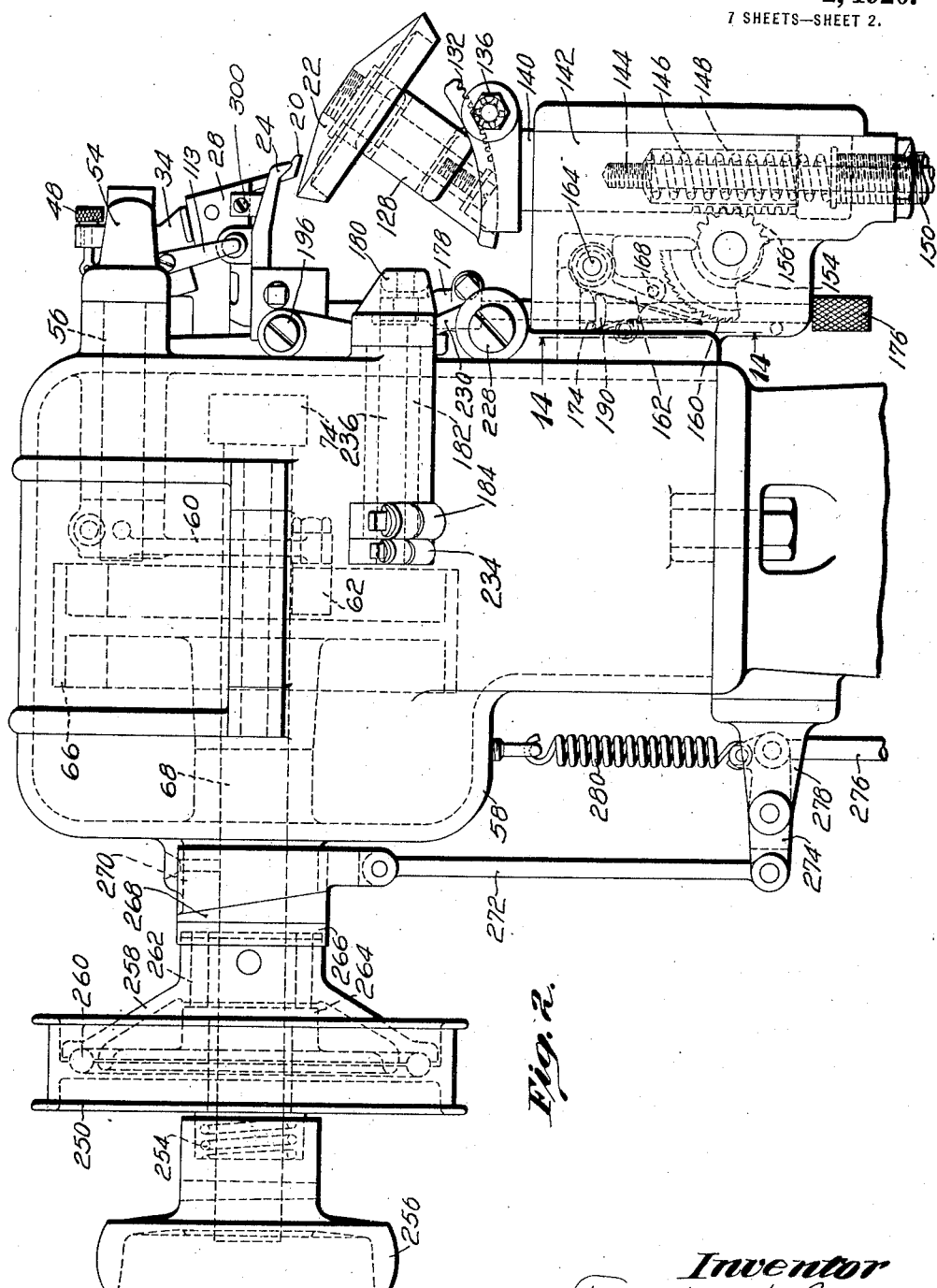

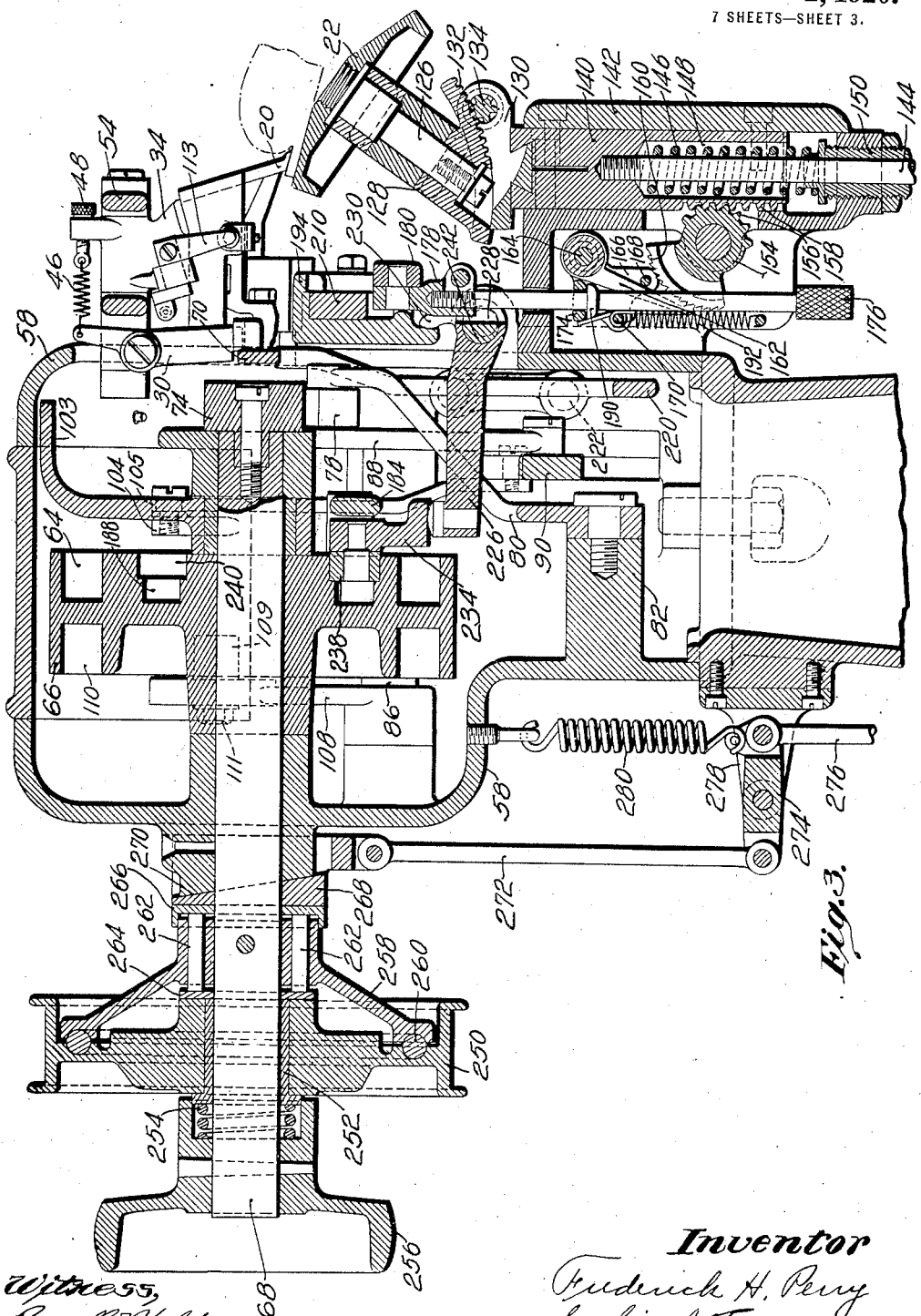

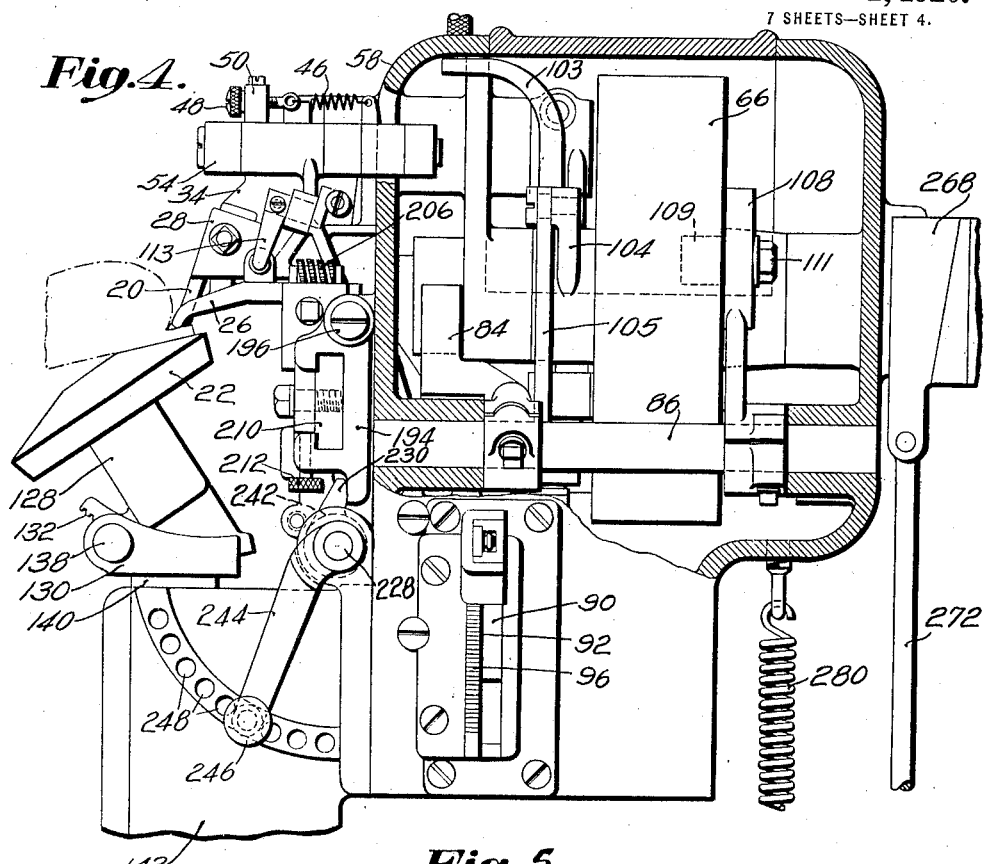
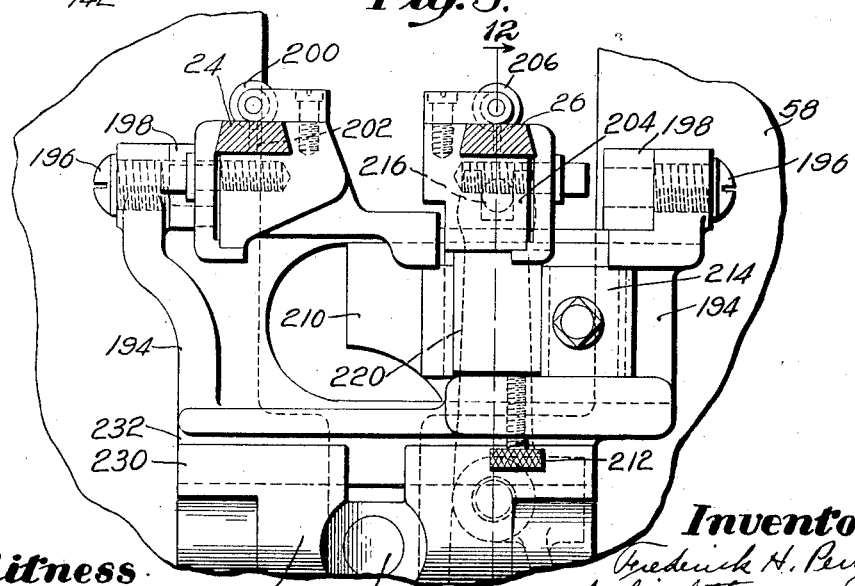

F. H. PERRY.
STITCH SEPARATING MACHINE.
APPLICATION FILED MAY 18, 1918.

1,357,511.

Patented Nov. 2, 1920.
7 SHEETS—SHEET 5.

Witness
Russell F. Hatch

Inventor
Frederick H. Perry
by his Attorneys
Van Everen Fish & Hildreth

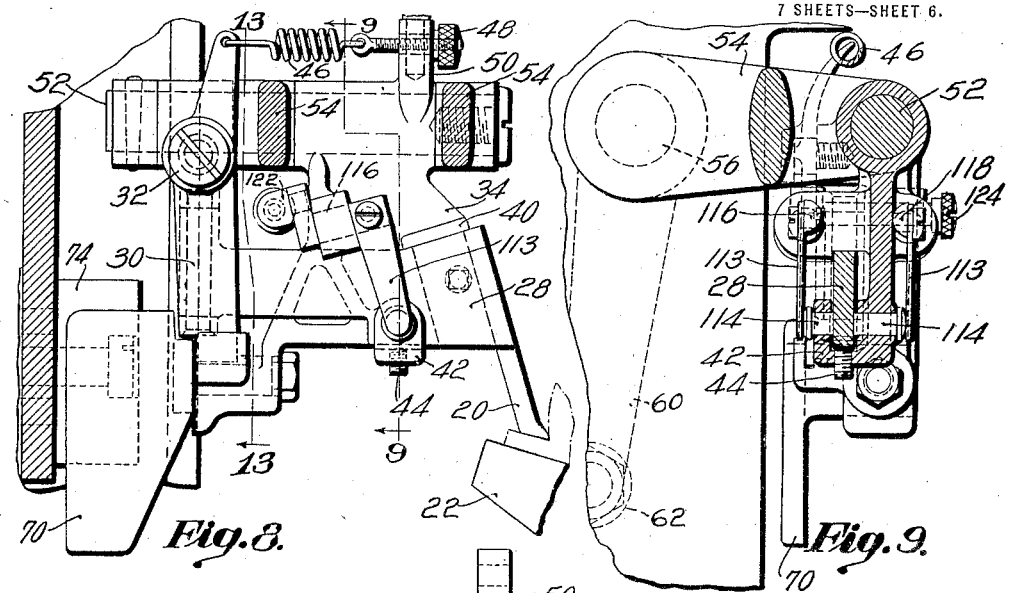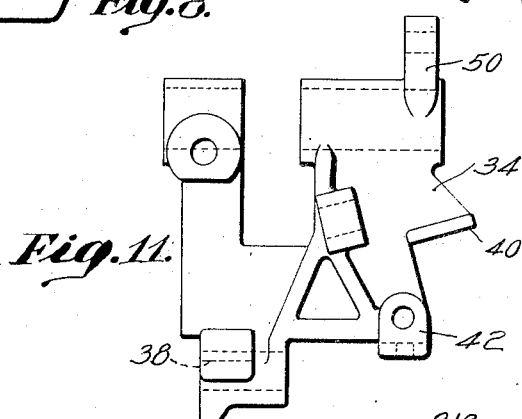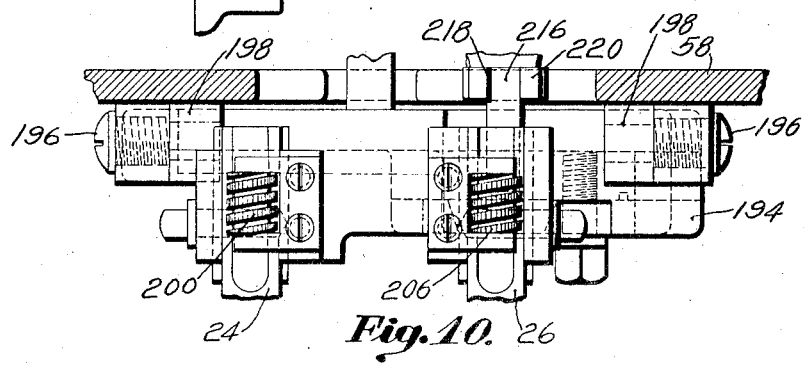

F. H. PERRY.
STITCH SEPARATING MACHINE.
APPLICATION FILED MAY 18, 1918.

1,357,511.

Patented Nov. 2, 1920.
7 SHEETS—SHEET 7.

Witness,
Roswell F. Hatch.

Inventor,
Frederick H. Perry
by his Attorneys
Van Everen Fish & Hildreth

UNITED STATES PATENT OFFICE.

FREDERICK H. PERRY, OF BEVERLY, MASSACHUSETTS, ASSIGNOR TO UNITED SHOE MACHINERY CORPORATION, OF PATERSON, NEW JERSEY, A CORPORATION OF NEW JERSEY.

STITCH-SEPARATING MACHINE.

1,357,511.          Specification of Letters Patent.      Patented Nov. 2, 1920.

Application filed May 18, 1918. Serial No. 235,237.

*To all whom it may concern:*

Be it known that I, FREDERICK H. PERRY, a citizen of the United States, residing at Beverly, in the county of Essex and State of Massachusetts, have invented certain new and useful Improvements in Stitch-Separating Machines; and I do hereby declare the following to be a full, clear, and exact description of the invention, such as will enable others skilled in the art to which it appertains to make and use the same.

This invention relates to stitch separating machines, and more particularly to that class of machines which are adapted to operate upon the edge of boot and shoe soles to indent the intervals between the stitches appearing on the upper surface of the sole.

The primary object of the invention is to provide a stitch separating machine of improved construction and mode of operation by which the stitch intervals of a sole edge may be more rapidly and uniformly indented than heretofore has been possible with the stitch separating machines in general use.

The uppers of many styles of shoes project out over the upper face of the sole, and it has been impracticable heretofore to extend the stitch indentation from the edge of the sole back to the junction of the upper with the sole, because a tool for accomplishing this purpose is liable to injure the upper while it is finding the stitch interval and feeding the shoe.

An object of the invention is to provide a stitch separating machine by which the stitch indentation on the upper edge of the sole may be extended back under the shoe upper. In accordance with this object, one feature of the invention contemplates the provision in a stitch separating machine having a stitch separating tool mounted on a support and means to actuate the support to force the tool into engagement with the sole edge, of means to move the tool under the shoe upper as the tool is forced into engagement with the sole edge.

In well-known forms of stitch separating machines, it is common to impart a vibrating movement of fixed amplitude to the indenting tool in the line of feed to find the stitch interval. An amplitude of vibration of the tool which is suitable for locating the interval of a coarse stitch is not so well adapted for locating the interval of a fine stitch, and for this reason the separation and indentation of fine stitches are not always uniform.

Accordingly, another feature of the invention contemplates the provision in a stitch separating machine having an indenting tool which is vibrated in the line of feed to locate the tool in the stitch intervals, of means to vary the amplitude of vibration of the tool independently of the feeding movement of the shoe. In the preferred form of the invention, the shoe is fed by the indenting tool, and the feeding movement of the tool is varied for operating on shoe soles having different lengths of stitches. To simplify the construction and facilitate the adjusting the machine for operation on different kinds of work, the amplitude of vibration of the tool is arranged to be simultaneously and correspondingly varied in accordance with the variation of the feeding movement of the tool.

The upper presser feet commonly used in stitch separating machines for locating a shoe on the work support engage the crease of the shoe so as to guide the shoe as it is fed past the indenting tool. It is desirable to use a presser foot at each side of the tool to prevent the upper from being moved into the path of movement of the tool and injured thereby. To obtain the best results, the presser feet should be located apart a distance substantially equal to the feeding movement of the tool.

Accordingly, another features of the invention contemplates the provision, in a stitch separating machine having a stitch separating tool arranged to feed a shoe and a presser foot at each side of the tool for holding the shoe in position on the work support, of means to vary the feeding movement of the tool, and simultaneously to vary the relative position of the presser feet in the line of feed.

Other features of my invention consist in certain devices and combinations of parts which will be hereinafter described and particularly defined in the claims.

Figure 7:
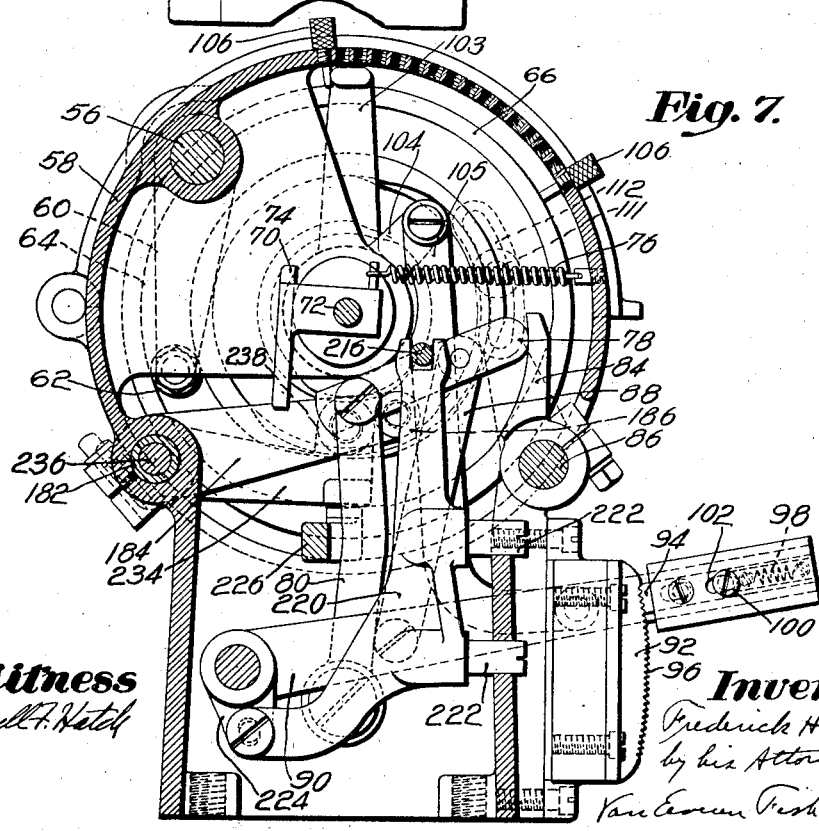
Figure 12:
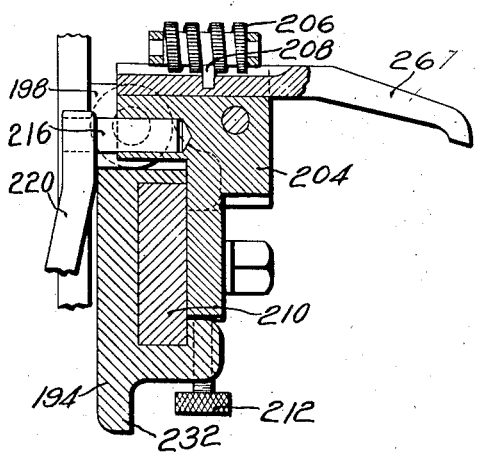
Figure 13:
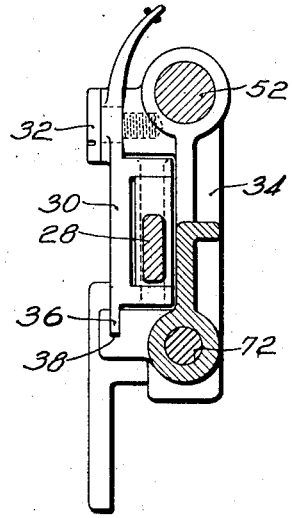
Figure 14:
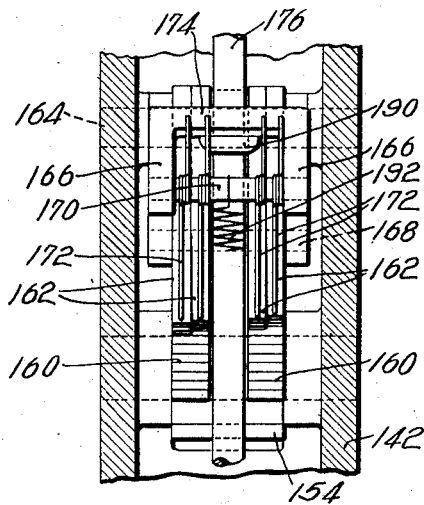
Figure 15:
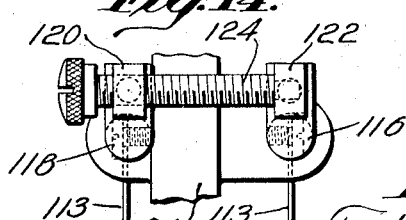

The various features of the invention are illustrated in the accompanying drawings, in which Figure 1 is a view, in front elevation, of the upper portion of a stitch separating machine embodying the preferred form of the invention; Fig. 2 is a view, in lefthand side elevation, of the machine shown in Fig. 1; Fig. 3 is a vertical sectional view of the machine; Fig. 4 is a view, in right-hand side elevation, partly in section, of the machine; Fig. 5 is a detail view in front elevation, partly in section, showing the carrier for the presser feet and the adjusting mechanism thereon for adjusting the presser feet; Fig. 6 is a plan-view of the machine with the parts broken away; Fig. 7 is a vertical sectional view of the head of the machine showing the mechanism for adjusting the amplitude of vibration and the feeding movement of the stitch separating tool; Fig. 8 is a detail view, in side elevation, showing the stitch separating tool and the supporting mechanism therefor; Fig. 9 is a detail view, in vertical section, of the supporting mechanism for the stitch separating tool taken on the line 9—9 of Fig. 8; Fig. 10 is a detail plan-view of the parts shown in Fig. 5; Fig. 11 is a detail view, in side elevation, of the tool supporting lever with the separating tool and its operating mechanism removed therefrom; Fig. 12 is a vertical sectional view of the carrier for the presser feet taken on the line 12—12 of Fig. 5; Fig. 13 is a vertical sectional view of the supporting mechanism for the separating tool, taken on the line 13—13 of Fig. 8; Fig. 14 is a detail sectional view of the locking mechanism for the work support taken on the line 14—14 of Fig. 2; and Fig. 15 is a detail view of the mechanism for adjusting the compression springs of the tool holder.

In the drawings, the indenting tool of the machine is indicated at 20 (Figs. 1, 2, 3 and 4), the work support at 22 and the presser-feet at 24 and 26.

The stitch separating and indenting tool 20 (Figs. 1, 3, 4 and 8), is secured in the outer end of a holder 28 which is mounted on a vertical pivot in a carrier 30 (Figs. 8 and 13). The upper end of the carrier 30 is mounted on a horizontal pivot pin 32 threaded into the upper portion of a tool support 34, and the lower end of the carrier has a tongue 36 (Fig. 13) which engages a slot 38 formed in the lower edge of the support. The outer end of the tool holder 28 is positioned between a pressing abutment 40, which is arranged to engage the upper edge of the holder, and a guide 42 (Fig. 9), which receives the lower edge of the holder. The holder is normally held in engagement with an adjusting screw 44 in the guide 42 by means of a tension spring 46 (Figs. 3 and 8) which is connected between an arm extending upwardly from the carrier 30 and an adjusting screw 48, mounted in a lug 50 projecting above the upper edge of the support 34.

As the tool is moved downwardly to indent the sole edge, it is also moved outwardly and toward the shoe upper in a direction transverse to the line of feed to elongate the indentation and extend the indentation up to the junction of the upper with the sole. To permit the indenting tool to be moved into pressing engagement with the sole edge, the support 34 is pivotally suspended on a rod 52 (Figs. 1, 3, 4, 6, 8 and 9) which is fixed in the arms of a yoke formed on the free end of a pressing lever 54. The pressing lever is secured to the outer end of a shaft 56 (Figs. 4 and 7) journaled in the frame 58 which supports the parts in the head of the machine and forms a casing for the driving mechanism which operates the indenting tool. A cam lever 60 (Figs. 2 and 7) is secured to the inner end of the shaft 56 and carries a cam roll 62 which enters a cam groove 64 (Figs. 3 and 7) formed on the front face of a driving cam 66 fixed on a main driving shaft 68. While the indenting tool is being located in a stitch interval, the tool holder 28 is held in engagement with the adjustable screw 44 by the spring 46, and as the support is moved downwardly by the cam 64, the tool holder and indenting tool will be rotated about the horizontal pivot 32 of the carrier 30. This rotation will continue until the tool holder has moved relatively to the supporting lever a sufficient distance to bring the pressing abutment 40 into engagement with the upper edge of the holder. Since the pivot 32 of the tool carrier is located above the operating face of the indenting tool, the operating face will be moved outwardly toward the shoe in Fig. 8, as the tool holder is so rotated, to extend the tool back under the upper before the sole is indented. During the continued downward movement of the support by the cam 64, the abutment 40 will force the tool into the sole edge to indent the stitch interval. The movement of the tool out under the upper may be increased or decreased for treating different styles of shoes, by adjusting the screw 44 which limits the amount of movement of the tool carrier on the pivot 32.

When the indenting tool has been pressed downwardly to indent the sole edge, it remains in engagement with the sole edge and the tool is then reciprocated to feed the shoe. To reciprocate the tool a plate 70 (Figs. 6, 7 and 8) is secured to the lower end of the support 34 by a bolt 72 and projects within the casing 58 to a position to engage the surface of a feed cam 74 mounted on the end of a driving shaft 68. The cam plate 70 is moved toward the cam 74 by means of a tension spring 76 (Fig. 7) which is connected between a pin secured to the cam plate and a pin mounted on the inner side of the casing 58. The cam acts to positively move the tool while the shoe is being fed and the spring 76 yieldingly retracts the tool preparatory to the next feeding operation.

It is desirable that the feeding movement of the indenting tool should be equal to the average distance between the stitch intervals of the particular seam in the edge of the sole to be indented so that when the tool has completed its feeding movement the succeeding interval, if the stitch is of average length, will be in a position where it will be directly engaged by the tool when it is next moved into engagement with the sole. In the machine illustrated in the drawings, the feed cam 74 advances the indenting tool up to a fixed point when feeding the shoe, and to vary the feeding movement of the tool, the tool is returned by the spring 76 a greater or less distance from the fixed point. To control the return movement of the tool, an abutment rod 78 is located below the feed cam in position to engage a downwardly extending portion on the cam plate 70 as the cam plate is drawn backwardly by the spring 76. When the cam plate engages the abutment rod, the feed cam will cease to control the movement of said plate and the plate will be held until the feed cam is rotated a sufficient distance to again engage the cam plate to move it forwardly for the next feeding movement of the tool. The forward end of the abutment rod 78 is pivotally connected to the upper end of a supporting link 80 (Figs. 3 and 7), pivotally mounted on a stud 82 formed on the inner side of the casing 58 (Fig. 3). The rear end of the abutment rod engages a cam plate 84 (Fig. 7) secured to a rock shaft 86 journaled in the casing 58. When the rear end of the abutment rod is moved up and down along the face of the cam plate 84, the forward end of the abutment rod will be moved away from and toward the fixed point which determines the end of the feed stroke of the indenting tool, so that the feed stroke of the tool will be correspondingly varied. The mechanism for shifting the abutment rod along the cam plate 84 comprises a link 88 (Fig. 7) connected to the rear end of the rod and a hand lever 90 which is pivoted within the casing 58 and extends outwardly through said casing. The hand lever is normally maintained in adjusted position by means of a locking pawl 94 which is slidably mounted in the handle of the hand lever so as to engage a ratchet formed on an adjusting block 92 secured to the casing. The pawl is held in engagement with the ratchet 96 by means of a spring 98, and a headed screw 100 mounted in the pawl projects outwardly through a slot 102 in the lever handle and serves as a means by which the pawl may be withdrawn from the ratchet 96 to permit adjustment of the lever.

A stopping lever 103 is connected with the hand lever 90. The stopping lever (Figs. 3 and 7) is loosely pivoted concentrically with the driving shaft 68 and is provided with an arm 104 which is connected to the hand lever 90 by means of a link 105. The upper end of the stopping lever is arranged to engage stop pins 106 which are threaded through openings 107 formed in the casing 58. When the stopping lever 103 is set in the position shown in Fig. 7, the machine is set for the longest feed of the indenting tool, and when the stopping lever engages the lower pin 106 in the position shown in Fig. 7, the machine will be set for the shortest feed of the indenting tool.

When the tool is brought into engagement with the upper face of the sole edge, to locate the stitch interval, the abutment rod 78 holds the plate 70 in such position that the indenting tool is not under control of the feed cam, and the interval locating vibration of the tool is obtained by an oscillation of the abutment rod. The abutment rod 78 is oscillated by means of a cam lever 108 (Figs. 3, 4 and 7) secured to the inner end of the shaft 86 and provided with a cam roll 109 which enters the cam path 110 formed in the rear face of the cam 66. The cam roll 109 is mounted on a pin 111, adjustably secured in an arcuate slot 112 (Fig. 7) formed in the upper end of the cam lever 108. The pin 111 is moved toward and from the axis of the shaft 86 to increase or decrease the amplitude of vibration of the tool. The adjustment further permits the amplitude of vibration of the tool in its locating movement to be varied independently of the length of the feeding movement of the tool in order to secure the best movement of the tool for locating the stitch interval.

While the tool support 34 is being vibrated in the line of feed to locate the tool in the stitch interval, the tool holder 28 may move relatively to the support 34 about the vertical pivot of the holder in the carrier 30. To this end, the guides 42 (Fig. 9) on the supporting lever are spaced apart to permit the holder to move between them. The holder is normally held in central position between the guides 42 by means of leaf springs 113 (Figs. 8 and 9) which are mounted on opposite sides of the supporting lever and bear against plungers 114 slidably mounted in the guides and provided with shoulders at their outer ends which limit the inward movement of the plunger. The upper ends of the springs 113 are secured to rods 116 and 118 which are rotatably mounted in the supporting lever, and swivel blocks 120 and 122 are mounted in offset portions of the rods 116 and 118 respectively (Figs. 9 and 15). An adjusting screw 124 is threaded through the block 120 and bears against the block 122. By adjusting the screw 124, the tension of the leaf springs 113 may be varied as required to cause the springs to coöperate properly with the spring 46 while the tool is finding a stitch interval. With this construction, the tool will yieldingly drag on the sole edge until it moves into the stitch interval, then it will be held in the stitch interval and permit the support to move relatively to the holder 28 while said support is completing the interval locating vibration. By reason of the fact that the pivot of the holder 28 is arranged in a vertical position, the stitch separating tool does not change its angular position with relation to the support 34 during the stitch locating and work feeding movements of the support. The tool is thus at all times in the most efficient position with relation to the work to locate a stitch interval and to remain in engagement therewith until the completion of the feeding movement.

It is desirable that the vibrating movement of the tool should be varied as the distance between the stitch intervals is varied, so as to insure the location of the tool in the proper stitch interval. For this purpose, the face of the cam plate 84 is so designed that as the rear end of the abutment rod 78 is moved upwardly and downwardly by the hand lever 90 to vary the length of feed, and the point of contact of the abutment rod with the cam path 84 is moved toward and from the axis of rotation of the cam plate, the amplitude of vibration of the tool will be varied proportionately to the variance in the feeding movement of the tool.

The work supporting table 22 is secured to the upper end of the spindle 126 (Figs. 2 and 3) rotatably mounted in a carrier 128 which is adjustably mounted in a block 130. The carrier 128 is mounted in a guideway in the block 130 which is curved approximately about the upper corner of the table as a center. An adjustment of the carrier in the block 130 will vary the angular relation between the upper face of the table and the lower face of the indenting tool to position the table for operating on different styles of shoes and to provide for the use of different kinds of indenting tools. The table is adjusted by means of a rack 132 formed on the bottom of the carrier 128 and which engages a pinion 134 formed on a locking bolt mounted in the block 130. By loosening a nut 136 (Fig. 1) on the locking bolt, the bolt may be rotated by a knurled handle 138 to vary the angular position of the table. After the table has been adjusted, it may be locked in adjusted position by setting the nut 136. The work supporting face of the table 22 is conical and presents a convex surface to the indenting tool. It is desirable that the highest point of the table should be placed opposite the point of pressure of the tool upon the work, or the indenting position of the tool. Since the indenting position of the tool is the position in which the tool is located in the stitch interval, the position varies with the different lengths of feed stroke, and therefore if the feed stroke is varied to any extent, the table should be adjusted in the line of feed to locate its highest point opposite the indenting position of the tool. To this end, the carrier block 130 has a dovetailed sliding connection in the upper end of the shank 140 by which the table may be adjusted in the line of feed. The table may also be lowered for inserting and removing work. To this end, the shank 140 is slidably mounted in a bracket 142 which is attached to the front side of the casing 58 (Figs. 1, 2 and 3), and a treadle rod 144 threaded into the shank extends down to the bottom of the machine and is connected to the foot treadle (not shown). The table is forced upwardly to force the sole against the presser-feet 24 and 26, by a coiled spring 146 which is mounted in a chamber 148 formed in the lower portion of the shank 140, and is confined between the upper end of the chamber 148 and an adjusting nut 150 threaded in the bracket 142. A stop 152 (Fig. 1), clamped on the rod 144 below the nut 150 limits the upward movement of the work table by the spring 146, and prevents the table from coming into contact with the indenting tool when the machine is running without work.

The table is held locked in its sole clamping position during the indenting operation of the tool by means of a locking lever 154 (Figs. 2 and 3), pivoted in the bracket 142, and which has a gear segment 156 on its forward end engaging a rack 158 formed on the rear side of the shank 140. A ratchet 160 formed on the rear end of the locking lever 154 is engaged by four locking pawls 162 (Figs. 3 and 14), pivoted on a pin 164 mounted in the bracket 142. The locking pawls remain in locking position during the feeding of the work. After each feeding stroke of the indenting tool, the table is unlocked by means of a releasing lever 166 which is pivoted on the pin 164 and has arms mounted on each side of the pawls 162 which are connected by a pin 168 (Figs. 3 and 4) arranged to engage the lower side of the pawls 162, a pin 170 arranged to carry a series of torsion springs 172 for moving the pawls into engagement with the ratchet 160, and a bar 174 through which passes an actuating rod 176. The upper end of the actuating rod 176 is threaded into a coupling 178 pivoted to the free end of a lever 180 (Figs. 1, 2 and 3), which is secured to the outer end of a hollow shaft 182 (Fig. 7) journaled in the casing 58. A cam lever 184 is secured to the inner end of the shaft 182 and carries a cam roll 186 (Fig. 7) which engages a cam path 188 (Figs. 3 and 7) formed on the front face of the cam 66. The bar 174 of the releasing lever 166 is held in engagement with an abutment 190 on the actuating rod 176 (Figs. 2 and 3) by means of a coiled spring 192 which is connected between the pin 170 and the bracket 142. By means of this construction, the locking pawls 162 are positively retracted from the teeth of the ratchet 160 by the cam 188 to unlock the table, and are yieldingly forced into engagement with the ratchet teeth by the springs 192 and 172 to lock the table. To vary the timing of the locking pawls 162, the actuating rod 176 is adjustably mounted in the coupling 178.

The presser-feet 24 and 26 have guiding faces on their outer ends which are arranged to enter the crease at the junction of the upper with the shoe sole to guide the sole while it is being indented. To position different types of soles and permit the use of different forms of indenting tools, the presser-feet are arranged to be adjusted transversely of the line of feed of the indenting tool. To this end, the presser-feet are mounted in a carrier 194 (Figs. 4, 5, 10 and 12), which is pivotally connected by pins 196 to lugs 198 (Figs. 5 and 10) formed on the front side of the casing 58. The presser-foot 24 has a dove-tailed mounting in the upper edge of the carrier, and is moved transversely of the line of feed by means of an adjusting screw 200 (Fig. 5) secured to the carrier 194 in position to receive in its thread a pin 202 projecting upwardly from the presser-foot. The presser-foot 26 has a dove-tailed mounting in a block 204 (Figs. 5 and 12), and is adjusted transversely of the line of feed by a screw 206 which is secured to the block in position to receive in its thread a pin 208 projecting upwardly from the presser-foot.

It is often desirable to have the presser-foot 26 projecting slightly below the presser-foot 24 in order that the work may be gripped firmly near the indenting position of the tool and the presser-foot 24 prevented from marring the face of the sole which has been indented. To accomplish this, the block 204 for supporting the presser-foot 26 is mounted for vertical adjustment in a slide 210, slidably mounted in horizontal guides formed in the carrier 194. The block 204 is adjusted in the slide 210 to vary the vertical position of the presser-foot 26 by means of a screw 212 threaded into the carrier 194 in position to engage the lower end of the block, and the block is locked in adjusted position by means of a clamping gib 214.

The presser-feet are preferably spaced apart a distance equal to the feeding movement of the indenting tool to secure the most accurate positioning of the shoe for the indenting operation. If the presser feet are spaced apart a greater distance than the feeding movement of the tool, a pointed-toe shoe is liable to project too far in between the presser-feet, so that it will be injured as the tool is moved down into contact with the sole edge. The presser-foot 24 is fixed in the line of feed and is provided with an adjustable stop 300 arranged to engage the tool holder 28 and limit the feeding movement of the indenting tool. The presser-foot 26 is movable in the line of feed and is arranged to be adjusted simultaneously with the adjustment of the feeding movement of the tool to maintain a fixed relation to the work indenting position of the tool. The mechanism for adjusting the presser-foot 26 in the line of feed comprises a pin 216 projecting rearwardly from the block 204, which is received in a slot 218 formed in the upper end of an adjusting slide 220. The adjusting slide is supported on a pair of pins 222 (Fig. 7) slidably mounted in the casing 58, and the lower end of the slide has a pin-and-slot connection with an arm 224 projecting downwardly from the hub of the hand lever 90. By means of this construction, the adjusting slide 220 is moved back and forth in a right line simultaneously with the movement of the hand lever 90 up and down to vary the feeding movement of the indenting tool. The reciprocating movement of the slide 220 is imparted to the presser foot slide 210, in the carrier 194, to adjust the presser-foot 26 in the line of feed.

During the return feed stroke of the tool, and while the tool is indenting the sole edge, the presser-feet are held against an upward vertical movement to permit the sole edge to be clamped under them by the work table. While the indenting tool is making its forward feed stroke, the presser-feet are released and allowed to move upwardly to avoid a drag of the presser-feet on the upper surface of the sole. To control the vertical position of the presser-feet, a locking lever 226 (Figs. 3 and 7) is loosely mounted on a shaft 228 (Figs. 3 and 4) which is journaled in bosses formed on the upper side of the table supporting bracket 142. An upwardly projecting lug 230 on the lever 226 engages a flange 232 formed on the lower edge of the presser-foot carrier 194, and the rearwardly extending arm of the lever 226 makes a sliding contact with a lug formed on the lower edge of a cam lever 234 (Figs. 3 and 7). The outer end of the cam lever 234 is attached to a shaft 236 which is journaled within the hollow shaft 182 (Fig. 7), and a cam roll 238 mounted on the inner end of the cam lever engages in cam groove 240 (Fig. 3) formed on the front face of the cam 66. The cam 240 is so constructed that the presser-foot carrier 194 will be moved inwardly toward the casing 58 to hold the presser-feet at a definite point vertically, for positioning the sole on the work table during the return stroke and indenting operation of the tool, and will be released to swing outwardly from the casing 58 to relieve the pressure of the presser-feet on the work during the feed stroke of the indenting tool.

To vary the depth of indentations formed by the indenting tool, the presser-feet are arranged to be adjusted vertically to vary their work supporting position with relation to the indenting tool. To this end, the lever 226 (Figs. 3 and 5) is mounted on an eccentric portion 242 of the shaft 228, and by rotating the shaft 228 the lug 230 on the lever 226 will be shifted toward and from the casing 58 to change the position of the presser-feet carrier 194 and thus vary the vertical work positioning position of both presser-feet simultaneously. The rotary adjustment of the shaft 228 is made by a hand lever 244 (Fig. 4) which is fixed to the outer end of the shaft. A locking plunger 246 mounted in the free end of the lever 244 is arranged to coöperate with a series of openings 248 formed on the side of the bracket 142 to lock the shaft 228 in any desired position.

The clutch for operating the main driving shaft 66 may be described as follows: A driving pulley 250 which is freely rotatable (Figs. 2 and 3) on a sleeve 252 slidably mounted on the shaft 68 is driven by a suitable source of power. A compression spring 254 surrounding the driving shaft is confined between a flange on the outer end of the sleeve 252 and a shoulder formed on a hand wheel 256 secured to the end of the shaft. The spring 254 normally acts to force the driving pulley into clutching engagement with a clutching member 258 which is pinned to the driving shaft. The frictional connection of the driving pulley with the clutching member is obtained through a round leather strip 260 which is mounted in a semi-cylindrical groove formed on the face of the clutching member and coöperates with a semi-cylindrical groove formed on the face of the driving pulley. The round leather strip 260 provides an efficient frictional driving surface which is durable and may be easily replaced. To disconnect the driving pulley from the clutching member 258, each of a series of pins 262, slidably mounted in the hub of the clutching member, has one end in engagement with a plate 264 which bears against the end of the sleeve 252, and the other end in engagement with a plate 266 which is arranged to be shifted axially of the shaft by a wedge block 268. The wedge block 268 is positioned between the plate 266 and a coöperating wedge face 270 formed on the casing 58, and when the block is moved upwardly, the driving pulley will be moved into engagement with the member 258. To move the wedge block upwardly, the block is connected by a link 272 and lever 274 with a treadle rod 276 which extends down to the lower part of the machine frame and is arranged to be connected with a foot treadle (not shown). The lever 274 is pivoted in a bracket 278 which is attached to the rear side of the machine frame, and the tension spring 280 (Fig. 3) which is connected between the inner end of the lever and the machine frame normally acts to hold the wedge block in position to disconnect the shaft from the driving pulley.

The operation of the machine has been fully set forth in connection with the description of the details of construction, and a further description of the operation of the machine is not believed to be necessary.

The preferred form of the invention having been thus described, what is claimed as new is:

1. A stitch separating machine having, in combination, a stitch separating tool, a tool support, a tool holder movable with relation to the tool support in locating a stitch interval without changing the angular relation of the tool and tool support, and means for actuating the tool support to cause the tool to locate the stitch intervals and feed the work.

2. A stitch separating machine having, in combination, a stitch separating tool, a tool support, a tool holder connected to the tool support and mounted to move about a vertical axis in locating a stitch interval, and means for actuating the tool support to cause the tool to locate the stitch intervals and feed the work.

3. A stitch separating machine having, in combination, a stitch separating tool, a tool support pivotally mounted on a substantially horizontal axis, a tool holder connected to the tool support and mounted to move with relation thereto about a substantially vertical axis in locating a stitch interval, and means for oscillating the tool support about said horizontal axis to cause the tool to locate the stitch intervals and feed the work.

4. A stitch separating machine having, in combination, a stitch separating tool, a pivotally mounted tool support, means to oscillate the support about its pivotal axis to feed the work, and means to move the pivotal axis of the support vertically to indent the work.

5. A stitch separating machine having, in combination, a stitch separating tool, a pivotally mounted tool support, means to oscillate the support about its pivotal axis to locate the tool in a stitch interval, and means to move the pivotal axis of the support vertically to indent the work.

6. A stitch separating machine having, in combination, a stitch separating tool, a pivotally mounted tool support, means to oscillate the support about its pivotal axis to locate the tool in a stitch interval, means to move the pivotal axis of the support vertically to indent the work, a tool carrier yieldingly mounted on said support, and an abutment to limit the relative movement of the carrier and support after the tool engages the work.

7. A stitch separating machine having, in combination, a stitch separating tool, a tool support, and means for actuating the support to cause the tool to indent the work, said tool having a movement with relation to the tool support toward the shoe upper after engagement with the work.

8. A stitch separating machine having, in combination, a stitch separating tool, a tool support, means for actuating the support to cause the tool to indent the work, said tool having a movement with relation to the tool support toward the shoe upper after engagement with the work, and means for varying the extent of such movement.

9. A stitch separating machine having, in combination, a stitch separating tool, a tool support, and means for actuating the support to cause the tool to indent the work, said tool being mounted on the tool support to be moved relatively thereto toward the shoe upper by the pressure of the tool on the work.

10. A stitch separating machine having, in combination, a stitch separating tool, a tool support, a tool carrier, means for actuating the support to cause the tool to indent the work, and a pivotal connection between the support and carrier arranged to cause a movement of the tool with relation to the tool support toward the shoe upper after engagement with the work.

11. A stitch separating machine having, in combination, a stitch separating tool, means to impart to said tool stitch locating and work feeding movements, and means for varying the extent of the stitch locating movements independently of the feeding movements.

12. A stitch separating machine having, in combination, a stitch separating tool, a tool support, a tool holder movably mounted on said support, means acting on opposite sides of said holder to hold the holder yieldingly in central position on the support, and means to actuate the support to cause the tool to locate the stitch intervals.

13. A stitch separating machine having, in combination, a stitch separating tool, a tool support, a tool holder movably mounted on said support, springs mounted on the support on opposite sides of the holder to hold the holder in central position on the support, and means to equalize the pressure of the springs on opposite sides of the holder.

14. A stitch separating machine having, in combination, a stitch separating tool, a tool support, a tool holder movably mounted on said support, springs mounted on the support at opposite sides of the holder to hold the holder in central position on the support, means to vary the pressure of the springs on the holder, and means to actuate the support to cause the tool to locate the stitch intervals.

15. A stitch separating machine having, in combination, a tool support, a tool mounted on said support, means to actuate the support to vibrate the tool to locate a stitch interval on the sole edge of a shoe, means to move the tool support to feed the shoe, and means for varying simultaneously but in different ratios the feeding movement of the tool and the amplitude of vibration of the tool.

16. A stitch separating machine having, in combination, a tool support, a tool mounted on said support, means to actuate the support to vibrate the tool to locate a stitch interval on the sole edge of a shoe, means to move the tool support to feed the shoe, and means for varying the extent of the stitch locating movements imparted to the support independently of the feeding movements imparted to said support.

17. A stitch separating machine having, in combination, a tool support, a tool mounted on said support, means to actuate the support to vibrate the tool to locate the stitch interval on the sole edge of a shoe, means to move the tool support to feed the shoe, means to vary simultaneously the feeding movement of the tool and the amplitude of vibration of the tool, and means to vary the amplitude of vibration of the tool independently of the feeding movement of the tool.

18. A stitch separating machine having in combination, a stitch separating tool, means to actuate the tool to indent the sole edge of a shoe and to feed the shoe, a shoe support, a presser foot for holding the shoe on the support, a feed adjusting lever under the control of the operator and mechanism connected to the lever for simultaneously varying the feeding movements of the tool and the position of the presser foot in the line of feed.

19. A stitch separating machine having, in combination, a stitch separating tool, means to actuate the tool to indent the sole edge of a shoe and to feed the shoe, a shoe support, a presser foot for holding the shoe on the support, means to vary the feeding movement of the tool during the continued operation of the machine, and means to vary simultaneously the position of the presser foot in the line of feed.

20. A stitch separating machine having, in combination, a stitch separating tool, means to actuate the tool to indent the sole edge of a shoe, means to feed the shoe, a support, a presser foot mounted at each side of the tool, and means to adjust one of said presser feet vertically relatively to the other presser foot.

21. A stitch separating machine having, in combination, a stitch separating tool, means to actuate the tool to indent the sole edge of a shoe, means to feed the shoe, a shoe support, a presser foot mounted at each side of the tool, and means to independently adjust said presser feet transversely of the line of feed.

22. A stitch separating machine having, in combination, a stitch separating tool, a shoe support, means to actuate the tool to indent the sole edge of a shoe, means to feed the shoe, a presser foot mounted opposite said support at each side of the tool, a carrier for said presser feet, and means to adjust said carrier to raise or lower the presser feet relatively to said support.

23. A stitch separating machine having, in combination, a stitch separating tool, a shoe support, means to actuate the tool to indent the sole edge of a shoe, means to reciprocate the tool to feed the shoe, means to vary the feeding movement of the tool, and means by which the support may be adjusted in the line of feed.

24. A stitch separating machine having, in combination, a stitch separating tool, a shoe support having a convex supporting surface, a vertically movable shank on which the support is mounted, means to reciprocate the tool from an indenting position to a fixed point to feed the shoe, means to vary the amplitude of reciprocation of said tool to vary the feeding movement, means to actuate the tool to indent the shoe, and means by which the support may be adjusted in the line of feed to position the center of the support opposite the indenting position of the tool.

25. A stitch separating machine having, in combination, a shoe support, a stitch separating tool, means to actuate the tool to indent the sole edge of a shoe, means to feed the shoe, a yieldingly mounted shank for said shoe support, a carrier for the shoe support slidably mounted on said shank, a rack formed on the face of the carrier in engagement with the shank, a pinion mounted in the shank to engage said rack, and means to lock the carrier in adjusted position.

26. A stitch separating machine having, in combination, a stitch separating tool, a tool support, a tool holder movably mounted on said support, springs mounted on the support on opposite sides of the holder to hold the holder in central position on the support, and means for limiting the inward movement of each spring.

27. A stitch separating machine having, in combination, a stitch separating tool, a tool support, a tool holder movably mounted on said support, spring actuated plungers on opposite sides of the holder to hold the holder in central position on the support, and means to limit the inward movement of each plunger.

28. A stitch separating machine having, in combination, a stitch separating tool, a pivotally mounted tool support, a tool holder connected to the tool support and mounted to move in relation thereto in locating a stitch interval, and means for oscillating the tool support to cause the tool to locate the stitch intervals and feed the work.

29. A stitch separating machine having, in combination, a stitch separating tool, a pivotally mounted tool support, a tool holder connected to the tool support and mounted to move with relation thereto in locating a stitch interval, means for oscillating the tool support to locate the tool in a stitch interval and feed the work, and means to move the pivotal axis of the support vertically to indent the work.

FREDERICK H. PERRY.